(12) United States Patent
Zhang et al.

(10) Patent No.: US 7,711,678 B2
(45) Date of Patent: May 4, 2010

(54) SOFTWARE TRANSACTION COMMIT ORDER AND CONFLICT MANAGEMENT

(75) Inventors: Lingli Zhang, Goleta, CA (US); Vinod K. Grover, Mercer Island, WA (US); Michael M. Magruder, Sammamish, WA (US); David Detlefs, Westford, MA (US); John Joseph Duffy, Renton, WA (US); Goetz Graefe, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 249 days.

(21) Appl. No.: 11/601,541

(22) Filed: Nov. 17, 2006

(65) Prior Publication Data

US 2008/0120484 A1 May 22, 2008

(51) Int. Cl.
*G06F 17/30* (2006.01)

(52) U.S. Cl. .............................. 707/3; 707/10; 707/204

(58) Field of Classification Search ........................ None
See application file for complete search history.

(56) References Cited

U.S. PATENT DOCUMENTS

| | | | |
|---|---|---|---|
| 5,241,675 A | 8/1993 | Sheth et al. | |
| 5,335,343 A | 8/1994 | Lampson et al. | |
| 5,701,480 A | 12/1997 | Raz | |
| 6,754,737 B2 | 6/2004 | Heynemann et al. | |
| 6,785,779 B2 | 8/2004 | Berg et al. | |
| 7,089,253 B2 | 8/2006 | Hinshaw et al. | |
| 7,146,366 B2 * | 12/2006 | Hinshaw et al. ................. | 707/8 |
| 2003/0115276 A1 | 6/2003 | Flaherty et al. | |
| 2004/0015642 A1 | 1/2004 | Moir et al. | |
| 2004/0064439 A1* | 4/2004 | Hinshaw et al. ................. | 707/1 |
| 2004/0236659 A1* | 11/2004 | Cazalet et al. ................. | 705/37 |
| 2006/0112248 A1 | 5/2006 | Meiri et al. | |
| 2006/0190504 A1 | 8/2006 | Pruet, III | |
| 2006/0218206 A1 | 9/2006 | Bourbonnais et al. | |
| 2007/0198518 A1* | 8/2007 | Luchangco et al. ............ | 707/8 |

OTHER PUBLICATIONS

Costich Oliver, "Transaction Processing Using an Untrusted Scheduler in a Multilevel Database with Replicated Architecture", http://chacs.nrl.navv.mil/publications/CHACS/1992/1992costich-ds5.pdf.

Dekeyser, et al., "Conflict Scheduling of Transactions on XML Documents", Date: 2004, vol. 27, http://portal.acm.org/citation.cfm?id=1012305.

Yeo, et al., "Linear Orderability of Transactions in Mobile Environment with Heterogeneous Databases", http://scholar.google.com/scholar?hl=en&lr=&q=cache: sE6ocsZOP6II.I:www.it.swin.edu.au/personal/ihan/ihanPapers/icci96.ps+transaction.

* cited by examiner

*Primary Examiner*—Baoquoc N To
(74) *Attorney, Agent, or Firm*—Capitol City TechLaw; Richard C. Irving

(57) ABSTRACT

Various technologies and techniques are disclosed for applying ordering to transactions in a software transactional memory system. A software transactional memory system is provided with a feature to allow a pre-determined commit order to be specified for a plurality of transactions. The pre-determined commit order is used at runtime to aid in determining an order in which to commit the transactions in the software transactional memory system. A contention management process is invoked when a conflict occurs between a first transaction and a second transaction. The pre-determined commit order is used in the contention management process to aid in determining whether the first transaction or the second transaction should win the conflict and be allowed to proceed.

18 Claims, 11 Drawing Sheets

SOFTWARE TRANSACTION COMMIT ORDER AND CONFLICT MANAGEMENT

BACKGROUND

Software transactional memory (STM) is a concurrency control mechanism analogous to database transactions for controlling access to shared memory in concurrent computing. A transaction in the context of transactional memory is a piece of code that executes a series of reads and writes to shared memory. STM is used as an alternative to traditional locking mechanisms. Programmers put a declarative annotation (e.g. atomic) around a code block to indicate safety properties they require and the system automatically guarantees that this block executes atomically with respect to other protected code regions. The software transactional memory programming model prevents lock-based priority-inversion and deadlock problems.

While typical STM systems have many advantages, they still require the programmer to be careful in avoiding unintended memory access orderings. For example, the order in which transactions are committed (i.e. commit processing) in a typical STM environment is unconstrained. Transactions race with one another to commit, meaning that whether transaction 1 commits before transaction 2 or after is often a product of the dynamic scheduling of the program (and often by program-specific logic too). Moreover, if two transactions conflict, such as by trying to write to the same piece of memory, then their committing order can be arbitrarily decided based on one of many possible contention management policies. In both of these scenarios, no particular commit order is guaranteed; therefore the burden is on the programmer to make sure that his/her program works correctly with either order. This makes parallel programming very difficult.

One approach to simplifying parallel programming is to automatically parallelize sequential programs, in a manner that guarantees that the semantics of the program are unchanged. In other words, if the sequential program works correctly, so does the parallelized version. Two (separate) variations of this concept to parallelize sequential programs have been termed, respectively, safe futures and speculative loop parallelization. In safe futures, the sequential version of a program might perform "A; B" (that is, do A then do B). The programmer can add an annotation (a "future") indicating that he or she thinks it might be possible to perform A and B in parallel without changing the program semantics—that A does not read any memory locations that B reads, nor vice-versa. But the system treats this strictly as a "hint" whose validity must be checked. It executes A and B as transactions, and if they conflict, it prevents B from committing if it would be serialized before A. This is an "undesirable" aspect of undetermined commit order referred to above.

Speculative loop parallelization is a similar idea, where the actions performed in the sequential program are the successive iterations of a loop. The programmer (or some static analysis) indicates that it may be advantageous to execute the loop in parallel, and the system runs each iteration of the loop as a parallel transaction, requiring that these transactions commit in the order the iterations would have committed in the original program.

SUMMARY

Various technologies and techniques are disclosed for applying ordering to transactions in a software transactional memory system. A software transactional memory system is provided with a feature to allow a pre-determined commit order to be specified for a plurality of transactions. The pre-determined commit order is used at runtime to aid in determining an order in which to commit the transactions in the software transactional memory system. In one implementation, the pre-determined commit order can be either total ordering or partial ordering. In the case of total ordering, the transactions are forced to commit in a linear order. In the case of partial ordering, the transactions are allowed to commit in one of multiple acceptable scenarios. In one implementation, a commit arbitrator keeps track of the next-to-commit value representing the transaction that should be allowed to commit next, and when a particular transaction is ready to commit, it is allowed to do so if its commit order number matches the next-to-commit value of the commit arbitrator.

A contention management process is invoked when a conflict occurs between a first transaction and a second transaction. The pre-determined commit order is used in the contention management process to aid in determining whether the first transaction or the second transaction should win the conflict and be allowed to proceed.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
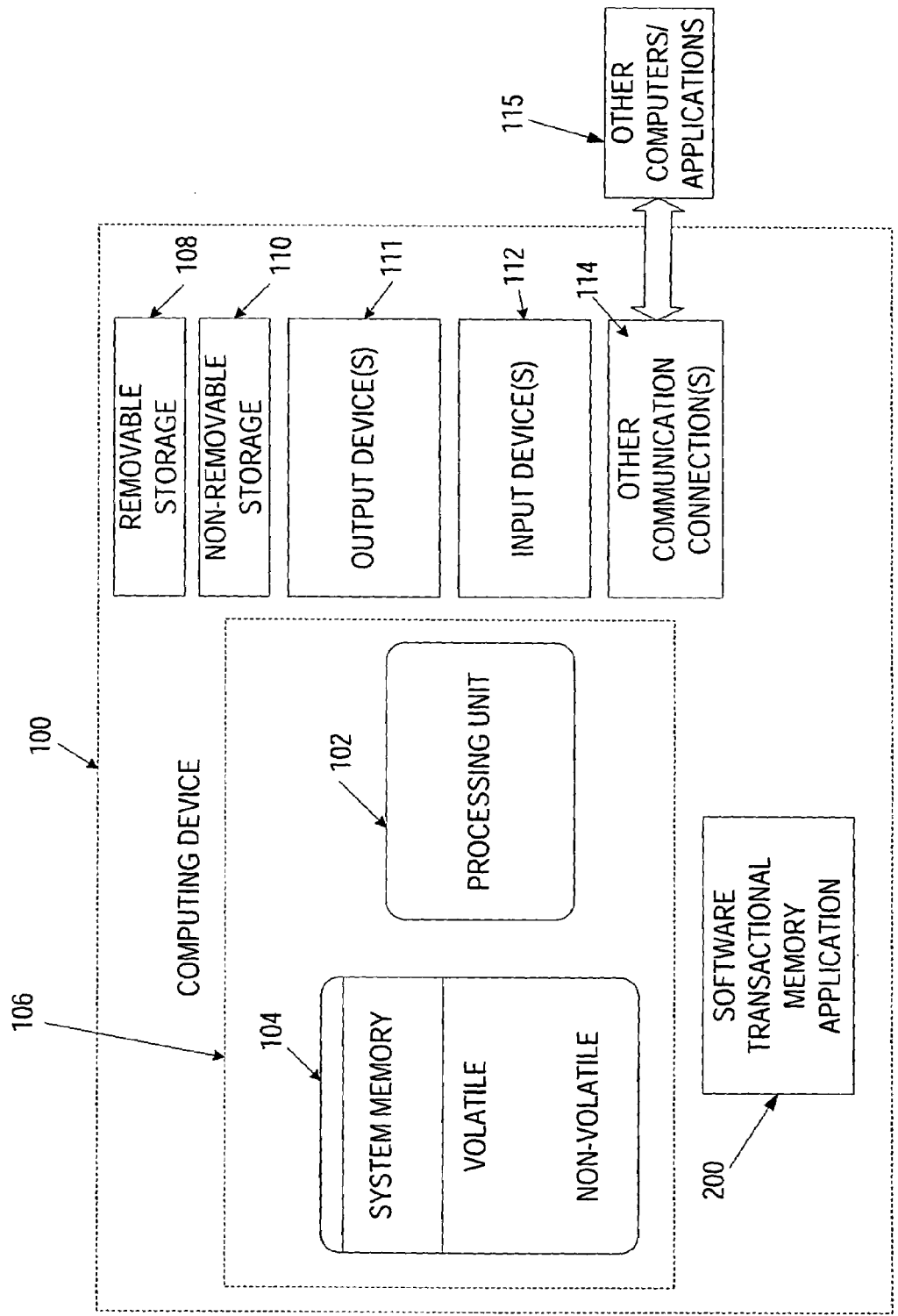
FIG. 1 is a diagrammatic view of a computer system of one implementation.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as a software transactional memory system, but the system also serves other purposes in addition to these. In one implementation, one or more of the techniques described herein can be implemented as features within a framework program such as MICROSOFT®.NET Framework, or from any other type of program or service that provides platforms for developers to develop software applications. In another implementation, one or more of the techniques described herein are implemented as features with other applications that deal with developing applications that execute in concurrent environments.

A feature is provided in the software transactional memory system to allow a pre-determined commit order to be specified for a plurality of transactions. The pre-determined commit order is used to aid in determining an order in which to commit the transactions. In one implementation, a contention management process is invoked when a conflict occurs between a first transaction and a second transaction. The pre-determined commit order is then used in the contention management process to aid in determining whether the first transaction or the second transaction should win the conflict and be allowed to proceed.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media, also known as computer-readable media, includes volatile and nonvolatile, removable and non-removable media implemented in any method or technology for storage of information such as computer-readable instructions, data structures, program modules or other data. Memory 104, removable storage 108 and non-removable storage 110 are all examples of computer-readable media. Computer-readable media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other computer-readable medium which can be used to store the desired information and which can be accessed by device 100. Any such computer-readable media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here. In one implementation, computing device 100 includes software transactional memory application 200. Software transactional memory application 200 will be described in further detail in FIG. 2.

Figure 2:
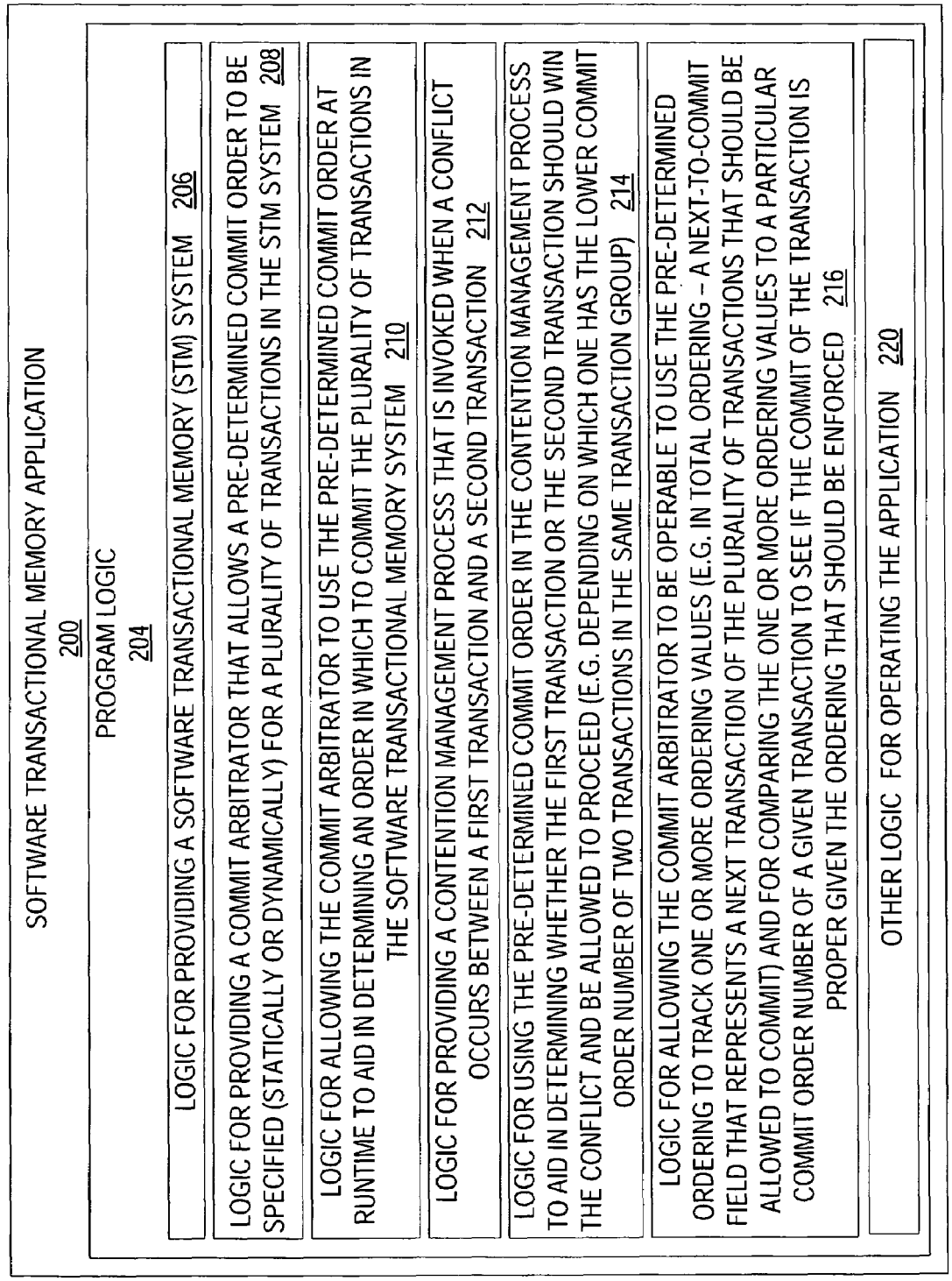
FIG. 2 is a diagrammatic view of a software transactional memory application of one implementation operating on the computer system of FIG. 1.

Turning now to FIG. 2 with continued reference to FIG. 1, a software transactional memory application 200 operating on computing device 100 is illustrated. Software transactional memory application 200 is one of the application programs that reside on computing device 100. However, it will be understood that software transactional memory application 200 can alternatively or additionally be embodied as computer-executable instructions on one or more computers and/or in different variations than shown on FIG. 1. Alternatively or additionally, one or more parts of software transactional memory application 200 can be part of system memory 104, on other computers and/or applications 115, or other such variations as would occur to one in the computer software art.

Software transactional memory application 200 includes program logic 204, which is responsible for carrying out some or all of the techniques described herein. Program logic 204 includes logic for providing a software transactional memory (STM) system 206; logic for providing a commit arbitrator that allows a pre-determined commit order to be specified, statically or dynamically, for a plurality of transactions in the STM system 208; logic for allowing the commit arbitrator to use the pre-determined commit order at runtime to aid in determining an order in which to commit the plurality of transactions in the software transactional memory system 210; logic for providing a contention management process that is invoked when a conflict occurs between a first transaction and a second transaction 212; logic for using the pre-determined commit order in the contention management process to aid in determining whether the first transaction or the second transaction should win the conflict and be allowed to proceed (e.g. depending on which one has the lower commit order number of two transactions in the same transaction group) 214; logic for allowing the commit arbitrator to be operable to use the pre-determined commit ordering to track one or more ordering values (e.g. in total ordering—a next-to-commit field that represents a next transaction of the plurality of transactions that should be allowed to commit) and for comparing the one or more ordering values to a particular commit order number of a given transaction to see if the commit of the given transaction is proper given the ordering that should be enforced 216; and other logic for operating the application 220. In one implementation, program logic 204 is operable to be called programmatically from another program, such as using a single call to a procedure in program logic 204.

Figure 3:
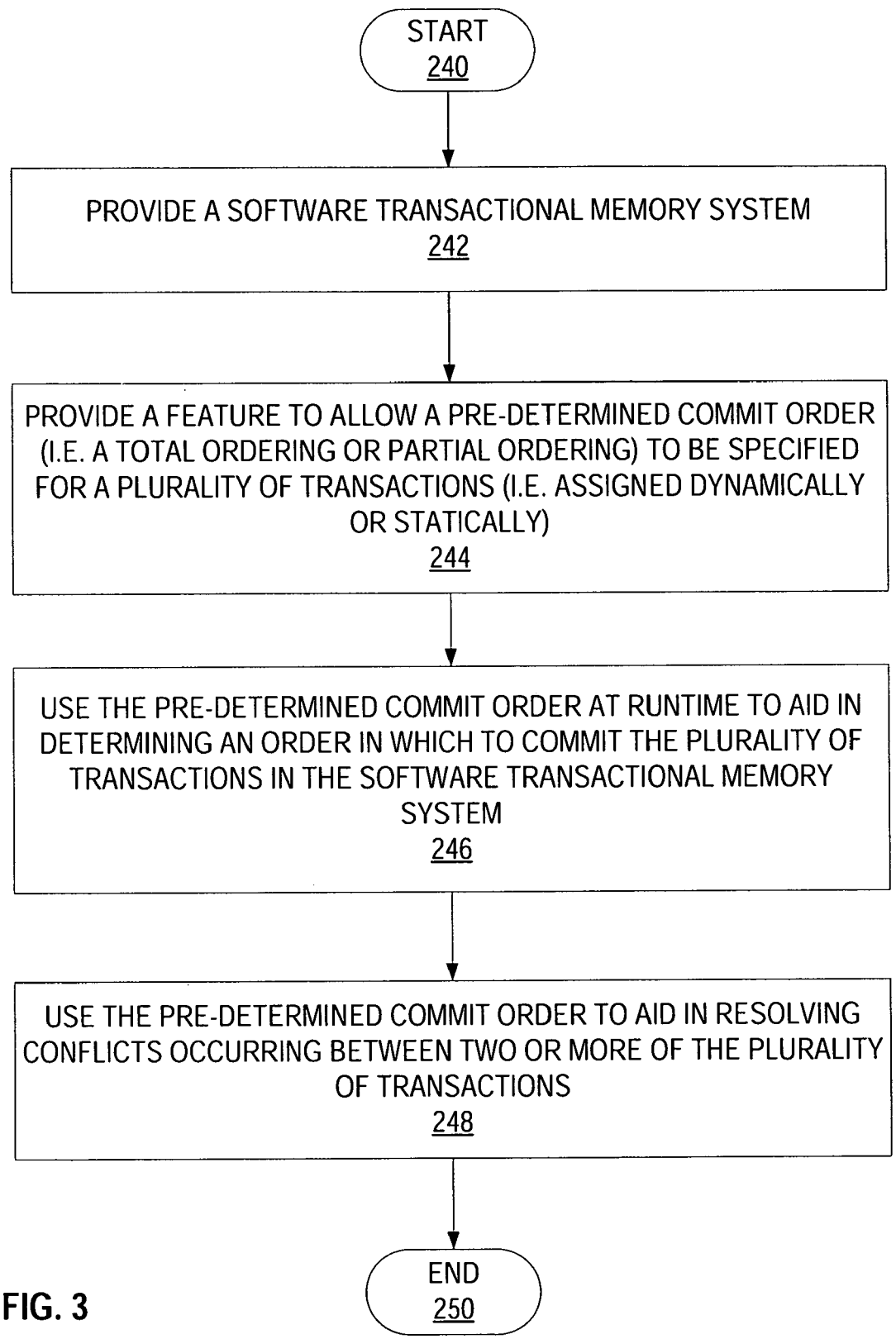
FIG. 3 is a high-level process flow diagram for one implementation of the system of FIG. 1.

Turning now to FIGS. 3-10 with continued reference to FIGS. 1-2, the stages for implementing one or more implementations of software transactional memory application 200 are described in further detail. FIG. 3 is a high level process flow diagram for software transactional memory application 200. In one form, the process of FIG. 3 is at least partially implemented in the operating logic of computing device 100.

The procedure begins at start point 240 with providing a software transactional memory system (stage 242). A feature is provided to allow a pre-determined commit order (e.g. a total ordering or partial ordering) to be specified for a plurality of transactions (e.g. assigned dynamically or statically) (stage 244). The term "pre-determined commit order" as used herein is meant to include a specific order in which a particular group of related transactions should be committed, as determined at any point in time before the transactions start running. The term "group" of transactions as used herein includes a particular set of (e.g. plurality of) transactions managed by the same commit arbitrator, as well as nested children of those transactions.

The pre-determined commit order is used at runtime to aid in determining an order in which to commit the plurality of transactions in the software transactional memory system (stage 246). The pre-determined commit order is used to aid in resolving conflicts occurring between two or more of the plurality of transactions (stage 248). The process ends at end point 250.

Figure 4:
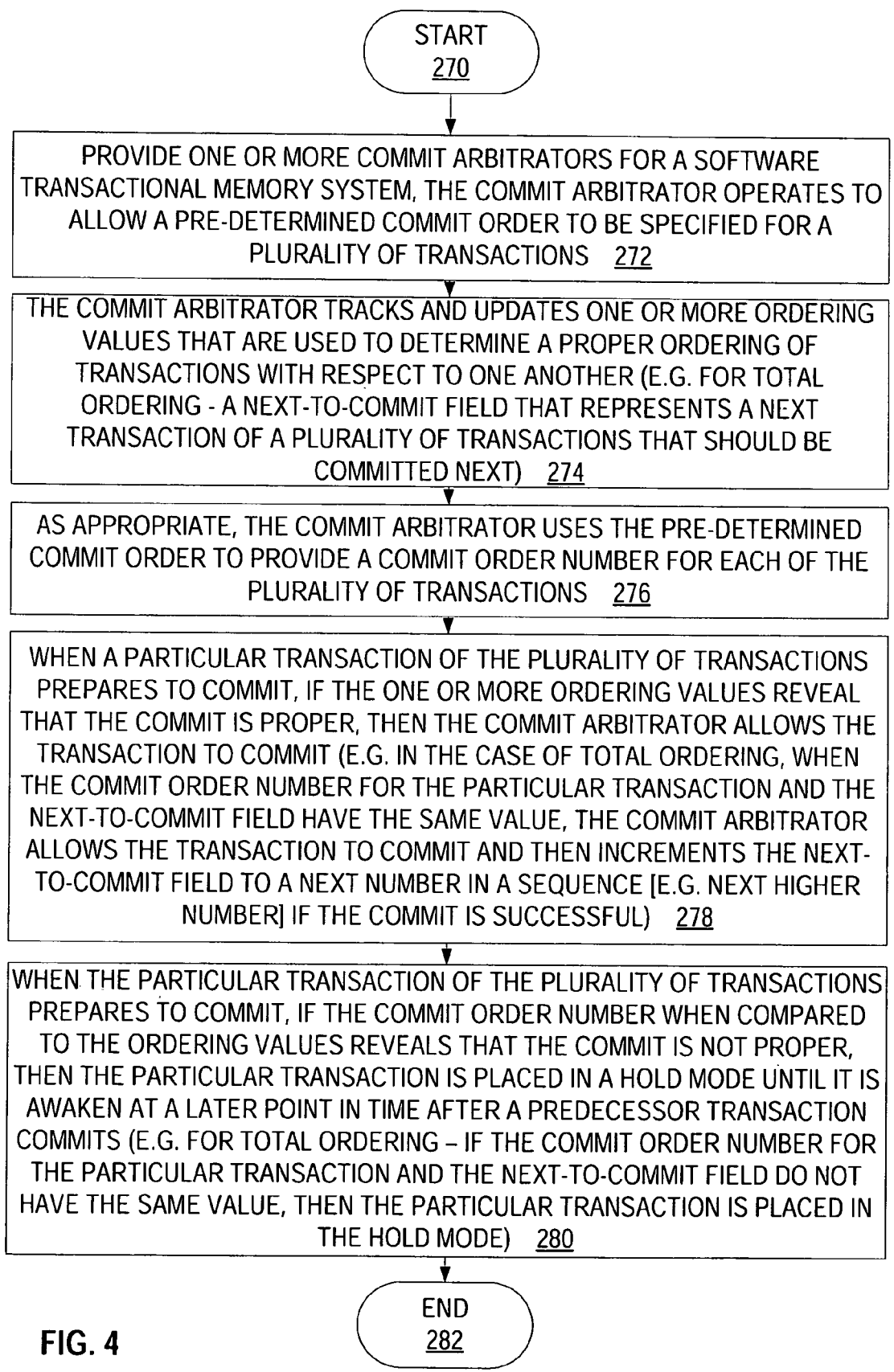
FIG. 4 is a process flow diagram for one implementation of the system of FIG. 1 illustrating the stages involved in using a commit arbitrator to enforce a pre-determined commit order.

FIG. 4 illustrates one implementation of the stages involved in using a commit arbitrator to enforce a pre-determined commit order. In one form, the process of FIG. 4 is at least partially implemented in the operating logic of computing device 100. The procedure begins at start point 270 with providing one or more commit arbitrators for a software transaction memory system, the commit arbitrator being operable to allow a pre-determined commit order to be specified for a plurality of transactions (stage 272). The term "commit arbitrator" as used herein is meant to include any type of program, feature, or process that is responsible for managing one or more groups of transactions that should be ordered with respect to one another. In one implementation, there can be one or more commit arbitrators active within a program at any given time. For example, as many commit arbitrators as are needed can be created to manage the different groups of transactions. The commit arbitrator tracks and updates one or more ordering values that are used to determine the proper ordering of transactions with respect to one another (stage 274). In the case of total ordering, a next-to-commit field can be used to represent a next transaction of a plurality of transactions that should be committed next) (stage 274). In the case of partial ordering, a directed graph of different possible orders is tracked using the ordering values. As appropriate, the commit arbitrator uses the pre-determined commit order to provide a commit order number for each of the plurality of transactions (stage 276).

When a particular transaction of the plurality of transactions prepares to commit, if the commit order number for the particular transaction when compared to the one or more ordering values reveals that the commit is proper, then the commit arbitrator allows the transaction to commit (stage 278). In the case of total ordering, this scenario occurs when the next-to-commit field and the commit order number for the particular transaction have the same value. In such a scenario, the commit arbitrator allows the transaction to commit and then increments the next-to-commit field to a next number in a sequence (e.g. next higher number) if the commit is successful (stage 278). When the particular transaction of the plurality of transactions prepares to commit, if the commit order number for the particular transaction when compared to the ordering values reveals that the commit is not proper, then the particular transaction is placed in a hold mode until it is awakened at a later point in time after a predecessor transaction commits (stage 280). In the case of total ordering, this hold mode is entered when the next-to-commit field and the order number for the particular transaction do not have the same value.

In one implementation, the system may wake a transaction after its immediate predecessor has committed, in which case it may try to commit right away. Alternatively, the system may choose to wake a transaction after some non-immediate predecessor has committed, even though its immediate predecessor may not yet have committed. After being awakened, the system checks to see if it is appropriate for the transaction to really commit. If so, the transaction is committed. The process ends at end point 282.

Figure 5:
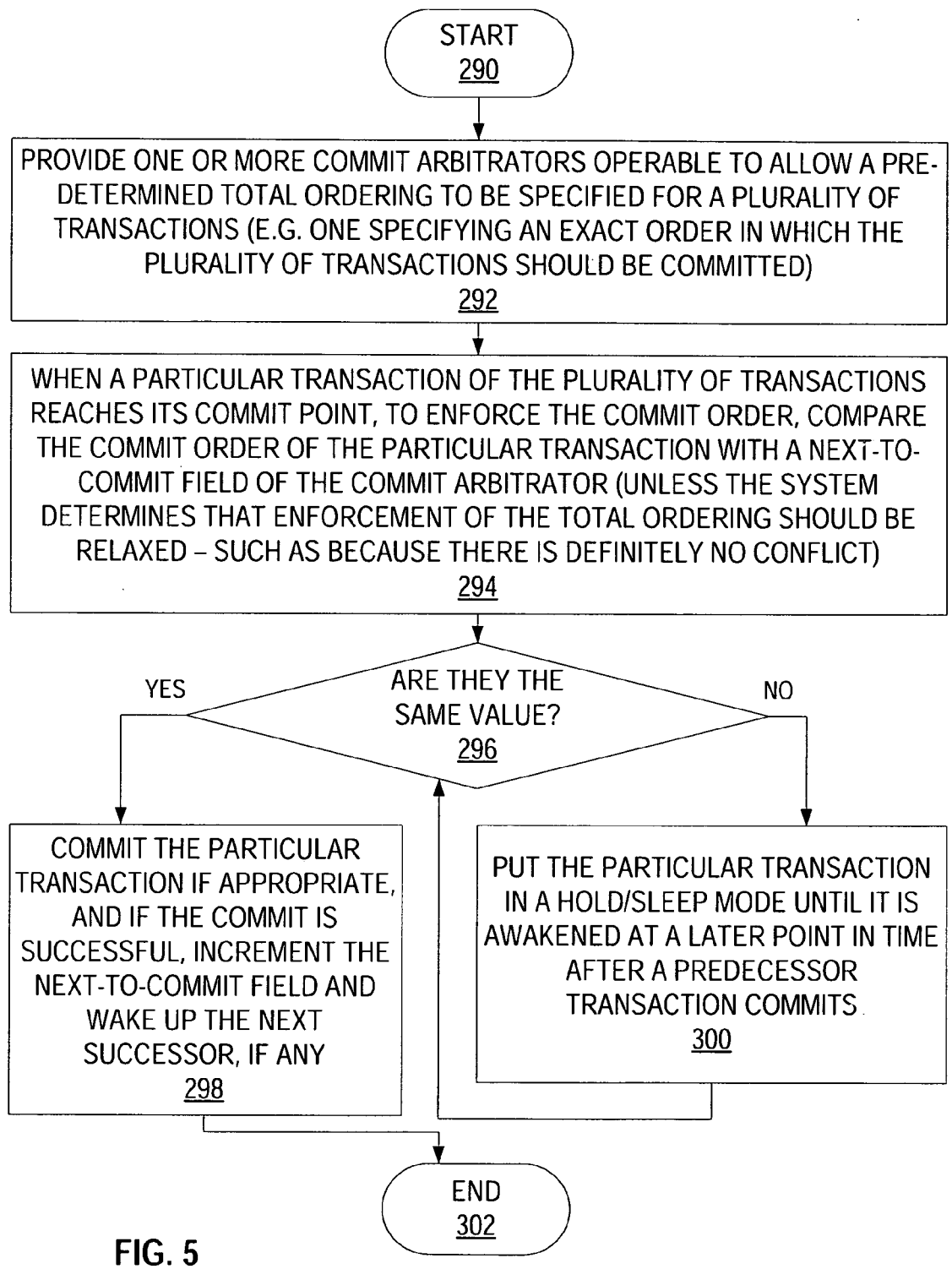
FIG. 5 is a process flow diagram for one implementation of the system of FIG. 1 illustrating the stages involved in using a commit arbitrator to enforce a total ordering of a plurality of transactions.

FIG. 5 illustrates one implementation of the stages involved in using a commit arbitrator to enforce a total ordering of a plurality of transactions. In one form, the process of FIG. 5 is at least partially implemented in the operating logic of computing device 100. The procedure begins at start point 290 with providing one or more commit arbitrators operable to allow a pre-determined total ordering to be specified for a plurality of transactions (e.g. one specifying an exact order in which the plurality of transactions should be committed) (stage 292). When a particular transaction of the plurality of transactions reaches its commit point, to enforce the commit order, the commit order of the particular transaction is compared with a next-to-commit field of the commit arbitrator (stage 296). In one implementation, if the system determines that enforcement of the total ordering is not necessary (e.g. such as because there is definitely no conflict), then the total ordering requirement can be broken as appropriate (stage 294), then the process ends at end point 302.

If commit ordering is to be enforced, and if the commit order of the particular transaction has a same value as the next-to-commit field of the commit arbitrator (decision point 296), then the particular transaction is committed, and if the commit is successful, the next-to-commit field is incremented and the next successor is awakened, if any exist (stage 298). If the commit order of the particular transaction does not have the same value as the next-to-commit field of the commit arbitrator (decision point 296), then the particular transaction is put in a hold/sleep mode until it is awakened at a later point in time after a predecessor transaction commits (stage 300). In one implementation, at that later point in time, if a conflict occurs with a predecessor, that particular transaction may be asked to abort and rollback such that a predecessor may make forward progress. Otherwise, if no such conflict has occurred, that particular transaction should be able to commit once the commit order requirements described herein are met. The process then ends at end point 302.

Figure 6:
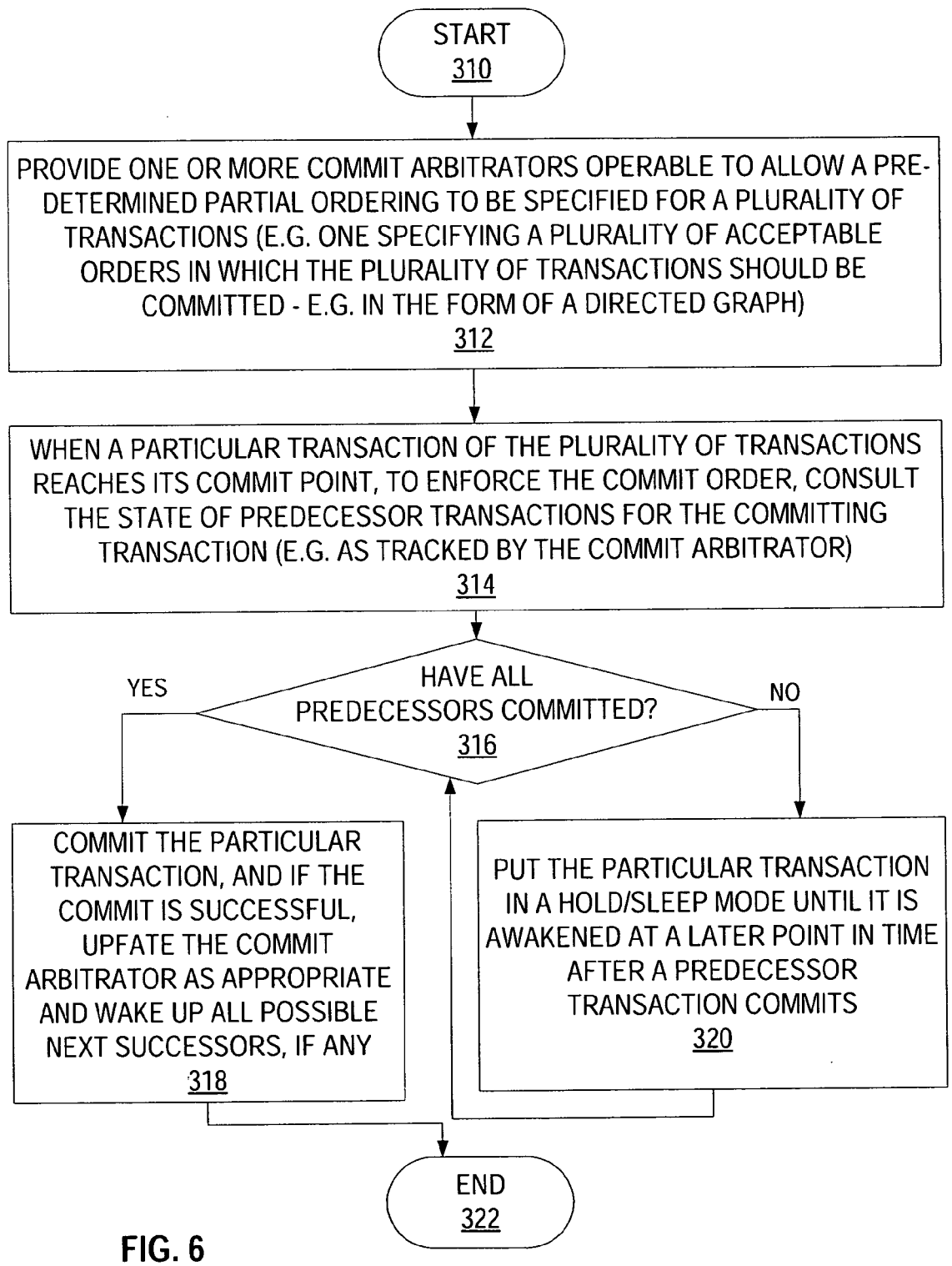
FIG. 6 is a process flow diagram for one implementation of the system of FIG. 1 illustrating the stages involved in using a commit arbitrator to enforce a partial ordering of a plurality of transactions.

FIG. 6 illustrates one implementation of the stages involved in using a commit arbitrator to enforce a partial ordering of a plurality of transactions. In one form, the process of FIG. 6 is at least partially implemented in the operating logic of computing device 100. The procedure begins at start point 310 with providing one or more commit arbitrators operable to allow a pre-determined partial ordering to be specified for a plurality of transactions (e.g. one specifying a plurality of acceptable orders in which the plurality of transactions should be committed—e.g. in the form of a directed graph) (stage 312). When a particular transaction of the plurality of transactions reaches its commit point, to enforce the commit order, the state of the predecessor transactions (e.g. one or more ordering values) are consulted for the particular committing transaction (e.g. as tracked by the commit arbitrator) (stage 314). If all predecessors to the particular transaction have committed (decision point 316), then the particular transaction is committed (stage 318). If the commit is successful, one or more values tracked by the commit arbitrator are updated as appropriate, and all possible next successors are awakened, if any exist (stage 318).

If all predecessors to the particular transaction have not committed (decision point 316), then the particular transaction is put in a hold/sleep mode until it is awakened at a later point in time after a predecessor transaction commits (stage 320). The process ends at end point 322.

Figure 7:
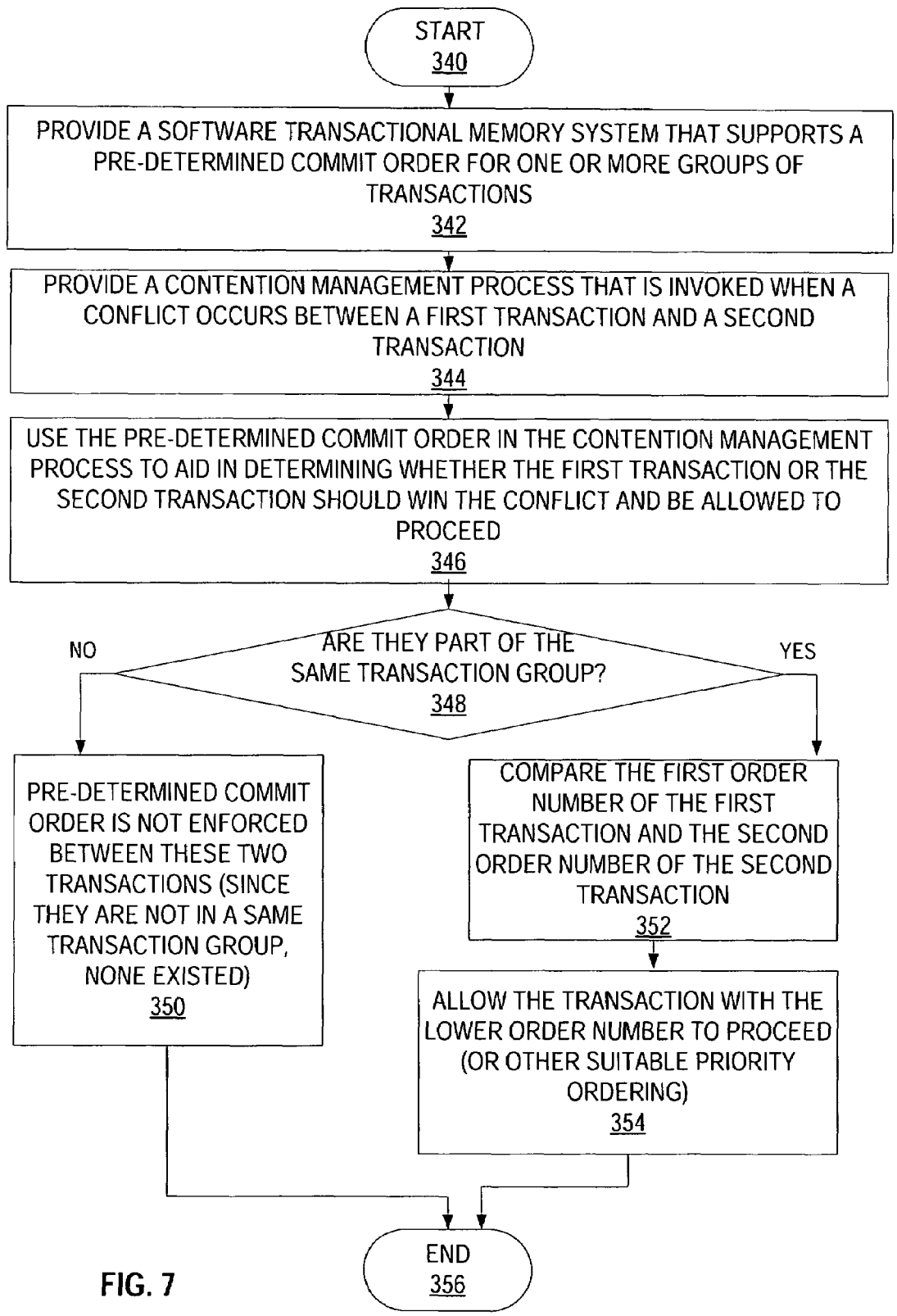
FIG. 7 is a process flow for one implementation of the system of FIG. 1 that illustrates the stages involved in providing a contention management process that manages conflicts using the pre-determined commit order information.

FIG. 7 illustrates one implementation of the stages involved in providing a contention management process that manages conflicts using the pre-determined commit order information. In one form, the process of FIG. 7 is at least partially implemented in the operating logic of computing device 100. The procedure begins at start point 340 with providing a software transactional memory system that supports a pre-determined commit order for one or more groups of transactions (stage 342). A contention management process is provided that is invoked when a conflict occurs between a first transaction and a second transaction (stage 344). The pre-determined commit order is used in the contention management process to aid in determining whether the first transaction or the second transaction should win the conflict and be allowed to proceed (stage 346). If the first transaction and second transaction are not part of the same transaction group (decision point 348), then a pre-determined commit order is not enforced between these two transactions (because none existed) (stage 350). In such a scenario, since the two transactions are not in a same transaction group, the ordering factor is not used to help resolve the conflict (stage 350).

If the first transaction and the second transaction are part of the same transaction group (decision point 348), then the system compares the first order number of the first transaction and the second order number of the second transaction (stage 352). The transaction with the lower order number is allowed to proceed (or with another suitable priority ordering) (stage 354). The process ends at end point 356.

Figure 8:
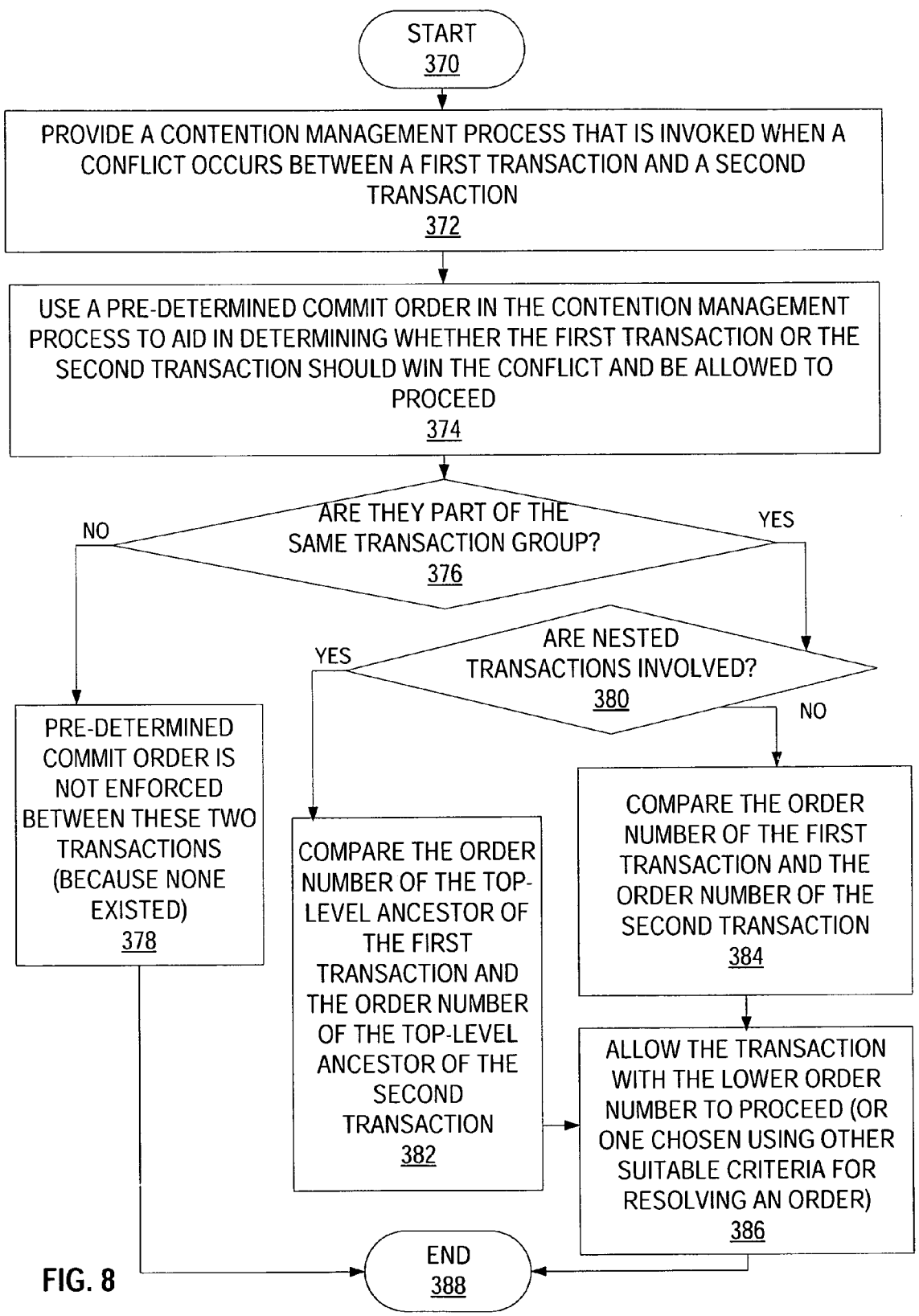
FIG. 8 is a process flow for one implementation of the system of FIG. 1 that illustrates the stages involved in providing a contention management process that manages conflicts with nested transactions using the pre-determined commit order information.

FIG. 8 illustrates one implementation of the stages involved in providing a contention management process that manages conflicts with nested transactions using the pre-determined commit order information. In one form, the process of FIG. 8 is at least partially implemented in the operating logic of computing device 100. In one implementation, the entire ancestor chain is considered for each transaction before committing the particular transaction, so that any ordering present in that chain is enforced. The procedure begins at start point 370 with providing a contention management process that is invoked when a conflict occurs between a first transaction and a second transaction (stage 372). A pre-determined commit order is used in the contention management process to aid in determining whether the first transaction or the second transaction should win the conflict and be allowed to proceed (stage 372). If the first and second transactions are not part of the same transaction group (decision point 376), then a pre-determined commit order is not enforced between those two transactions (because none existed) (stage 378) and the process ends at end point 388. If the first and second transactions are part of the same transaction group (decision point 376), then the system checks to see if nested transactions are involved (decision point 380).

If nested transactions are not involved (decision point 380), then the order number (or other ordering indicator) of the first transaction is compared with the order number (or other ordering indicator) of the second transaction (stage 384). The transaction with the lower order number is allowed to proceed (or the one determined to be next in order by using other suitable ordering criteria) (stage 386).

If nested transactions are involved (decision point 380), then the order number (or other ordering indicator) of the top level ancestor of the first transaction is compared with the order number (or other ordering indicator) of the top level ancestor of the second transaction (stage 382). The term "top level ancestor" as used herein is meant to include the immediate children of common ancestors where common ancestors are involved, and the top level ancestor of each transaction where there is no common ancestor involved. These scenarios involving common and uncommon ancestors are illustrated in further detail in FIGS. 9 and 10. The transaction with the lower order number is allowed to proceed (e.g. the transaction related to the ancestor that had the lower order number or other suitable criteria) (stage 386). The process ends at end point 388.

Figure 9:
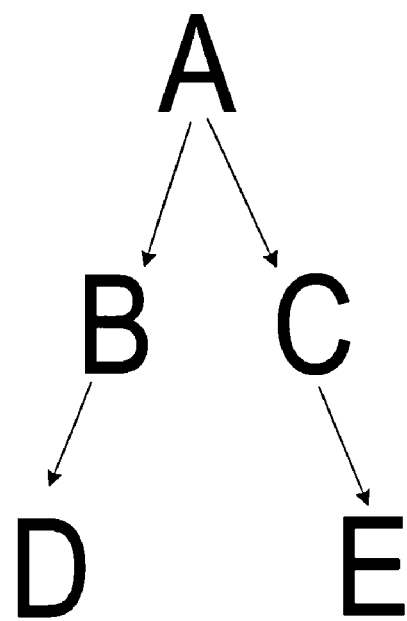
FIG. 9 is a logical diagram illustrating an exemplary ancestor tree with top level ancestors that have a common ancestor.

FIG. 9 is a logical diagram illustrating an exemplary ancestor tree with top level ancestors that have a common ancestor. In the example shown, transaction A is a common ancestor of D and E. In conflicts occurring between D and E, the order number of transactions B and C (the immediate children of common ancestor A) are analyzed to determine which transaction D or E should be allowed to proceed (stage 382 in FIG. 8).

Figure 10:
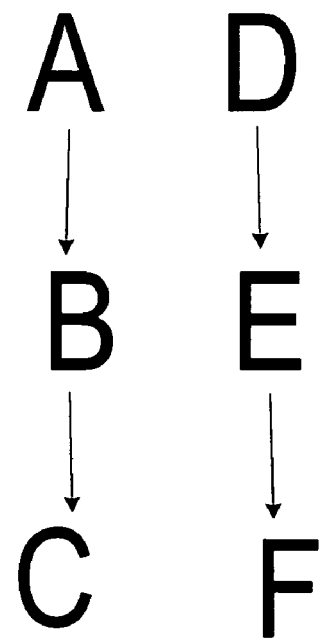
FIG. 10 is a logical diagram illustrating an exemplary ancestor tree with top level ancestors that do not have a common ancestor.

FIG. 10 is a logical diagram illustrating an exemplary ancestor tree with top level ancestors that do not have common ancestors. In the example shown, transaction A is an ancestor of transaction C. Transaction D is an ancestor of transaction F. In conflicts occurring between transactions C and F, then the order number of transactions A and D (the top level ancestor of each) are compared to determine which transaction C or F should be allowed to proceed (stage 382 in FIG. 8).

Figure 11:
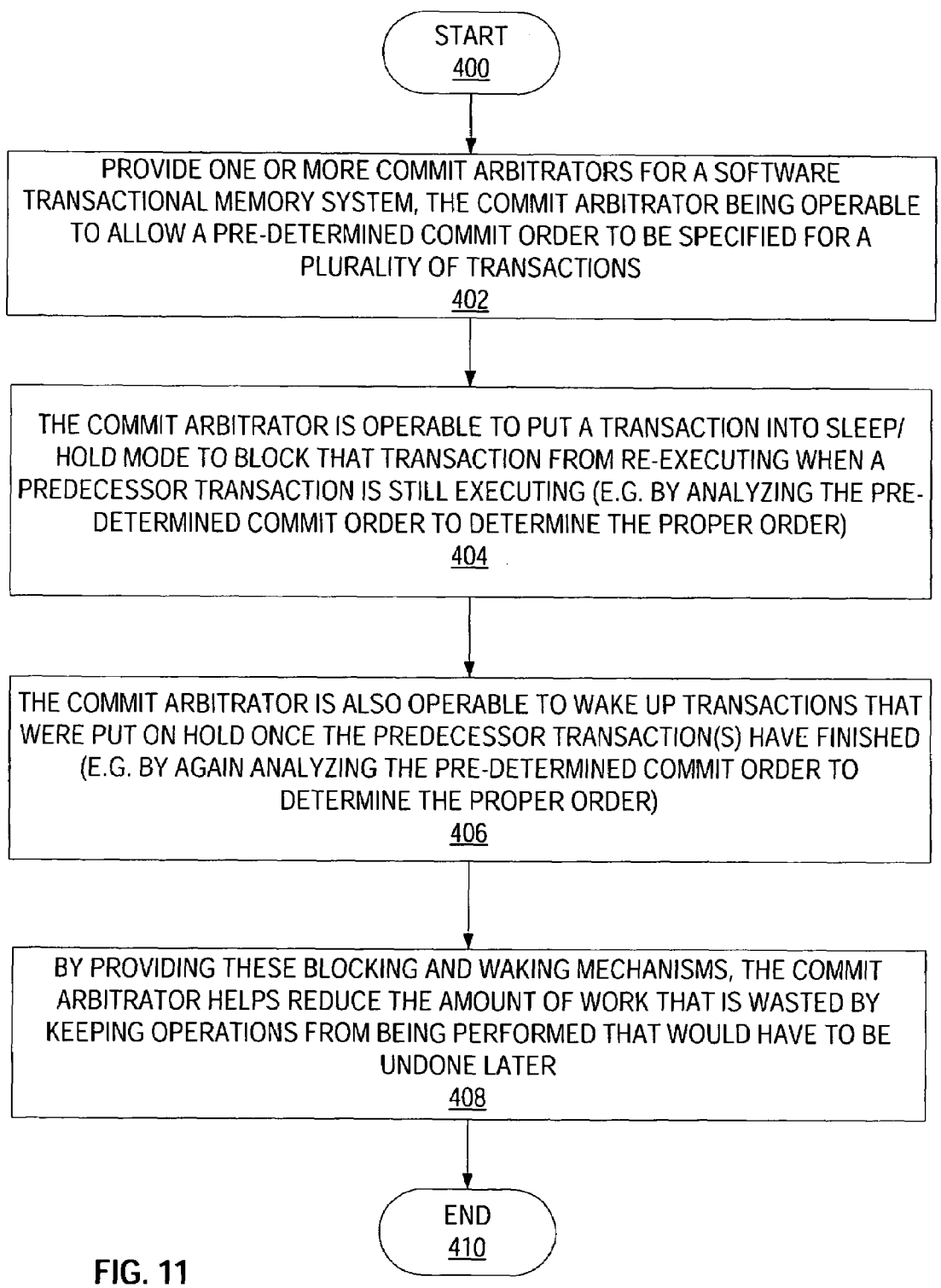
FIG. 11 is a process flow diagram for one implementation of the system of FIG. 1 that illustrates the stages involved in reducing an amount of wasted work by using a commit arbitrator in a software transactional memory system.

FIG. 11 illustrates one implementation of the stages involved in reducing the amount of wasted work by using a commit arbitrator in a software transactional memory system. In one form, the process of FIG. 11 is at least partially implemented in the operating logic of computing device 100. The procedure begins at start point 400 with providing one or more commit arbitrators for a software transactional memory system, the commit arbitrator being operable to allow a pre-determined commit order to be specified for a plurality of transactions (stage 402). The commit arbitrator is operable to put a transaction into sleep/hold mode to block that transaction from re-executing when a predecessor transaction is still executing (e.g. by analyzing the pre-determined commit order to determine the proper order (stage 404). The commit arbitrator is also operable to wake up transactions that were put on hold once the predecessor transaction(s) have finished (e.g. by again analyzing the pre-determined commit order to determine the proper order) (stage 406). By providing these blocking and waking mechanisms, the commit arbitrator helps reduce the amount of work that is wasted by keeping operations from being performed that would have to be undone later (stage 408). The process ends at end point 410.

Figure 12:
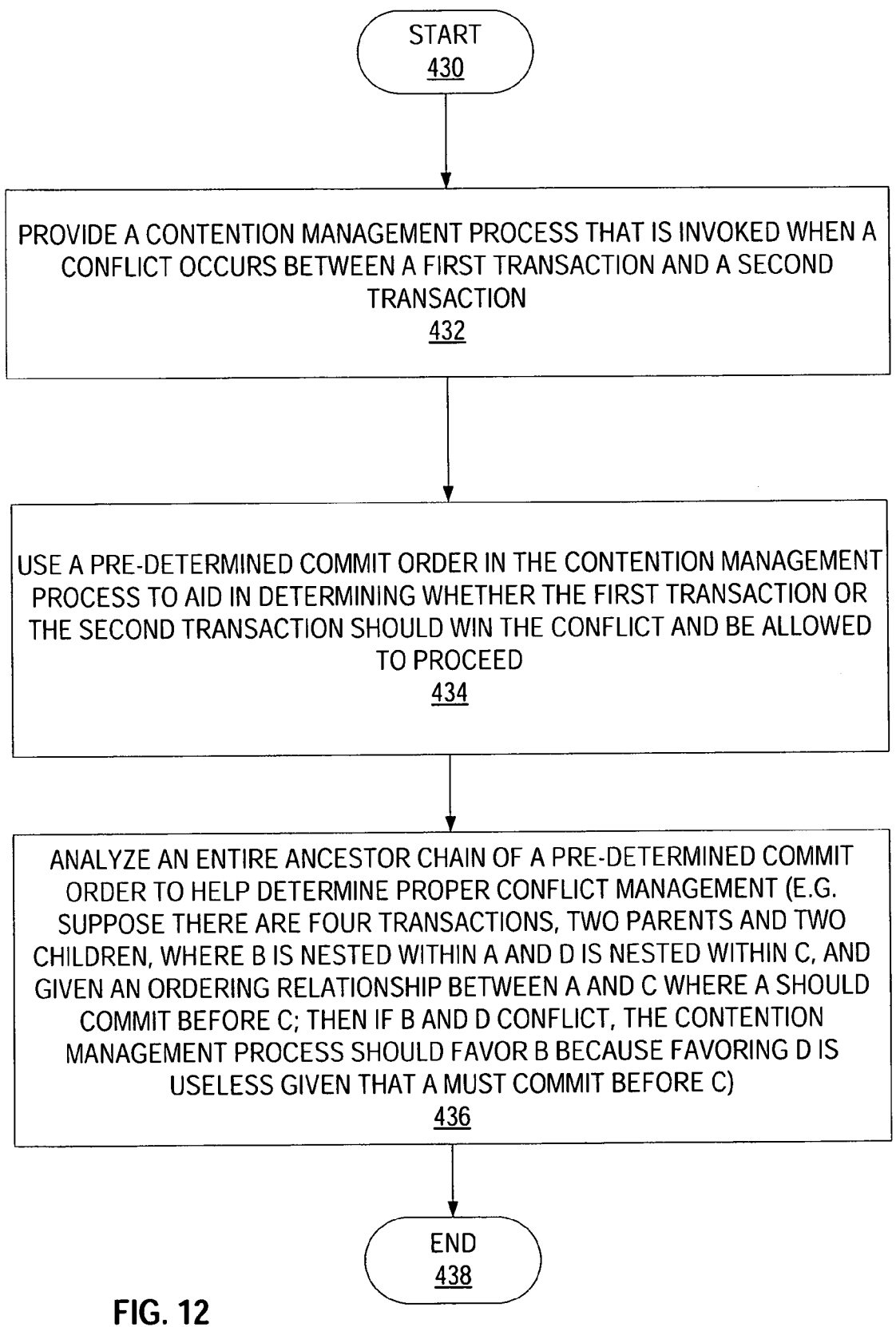
FIG. 12 is a process flow diagram for one implementation of the system of FIG. 1 that illustrates the stages involved in analyzing an entire ancestor chain in a contention management process to determine the proper conflict resolution.

FIG. 12 illustrates one implementation of the stages involved in analyzing an entire ancestor chain in a contention management process to determine the proper conflict resolution. In one form, the process of FIG. 12 is at least partially implemented in the operating logic of computing device 100. The procedure begins at start point 430 with providing a contention management process that is invoked when a conflict occurs between a first transaction and a second transaction (stage 432). A pre-determined commit order is used in the contention management process to aid in determining whether the first transaction or the second transaction should win the conflict and be allowed to proceed (stage 434). An entire ancestor chain of a pre-determined commit order is analyzed to help determine the proper conflict management (stage 436). For example, if there are four transactions, two parents and two children, where B is nested within A and D is nested within C. Suppose there is an ordering relationship between A and C where A should commit before C. If B and D conflict, the contention management process should favor B because favoring D is useless given that A must commit before C. (stage 436). The process ends at end point 438.

Although the examples discussed herein talked about enforcing commit ordering using various technologies and techniques, it should be noted that a transaction may not have a commit arbitrator at all. In such a case that a transaction does not have a commit arbitrator at all, a normal unordered commit will occur.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A method, implemented on a computer system, for applying ordering to transactions in a software transactional memory system comprising the steps of:
    allowing a pre-determined commit order to be specified for a plurality of related transactions at any point in time before executing the plurality of related transactions;
    using the pre-determined commit order to provide a commit order number for each of the plurality of related transactions;
    executing multiple transactions within a shared software transactional memory, wherein each of the multiple transactions executes atomically with respect to others of the multiple transactions in the software transaction memory, the executing including:
        executing a first transaction of the plurality of related transactions and a second transaction of the plurality of related transactions, the commit order number of the first transaction being different from the commit order number of the second transaction;
    managing the execution of the multiple transactions within the software transactional memory system, the managing including:
        detecting a conflict between the first transaction and the second transaction; and
        resolving the conflict by:
            placing the second transaction in a hold state based on the commit order number of the second transaction;
            committing the first transaction based on the commit order number of the first transaction; and
            committing the second transaction after the first transaction is committed,
    wherein the method is performed by at least one computing device of the computer system.

2. The method of claim 1, wherein the pre-determined commit order comprises a pre-determined total ordering of the plurality of related transactions in which the plurality of related transactions are forced to commit in a specific linear order.

3. The method of claim 1, wherein the pre-determined commit order comprises a pre-determined partial ordering of the plurality of related transactions, the pre-determined partial ordering specifying a plurality of acceptable orderings for committing the plurality of related transactions.

4. The method of claim 1, further comprising:
    tracking, by a commit arbitrator, one or more ordering values for the pre-determined commit order, the one or more ordering values being used to determine a proper ordering of committing of the plurality of related transactions with respect to one another.

5. The method of claim 4, wherein when a particular transaction of the plurality of related transactions prepares to commit, comparing the one or more ordering values to a commit order number provided for the particular transaction to determine whether to allow the particular transaction to commit.

6. The method of claim 1, wherein the pre-determined commit order is specified dynamically.

7. The method of claim 1, wherein the pre-determined commit order is specified statically.

8. The method of claim 1, further comprising:
    tracking, by a commit arbitrator, a next-to-commit field that represents a commit order number of a next transaction of the plurality of related transactions that should be allowed to commit.

9. The method of claim 8, wherein when a particular transaction of the plurality of related transactions prepares to commit, determining if a commit order number for the particular transaction has a same value as the next-to-commit field tracked by the commit arbitrator.

10. The method of claim 9, wherein if the commit order number for the particular transaction and the next-to-commit field have a same value, allowing the commit to proceed.

11. The method of claim 10, wherein after the commit proceeds and is successful, the commit arbitrator increments the next-to-commit field to a next number in a sequence.

12. The method of claim 9, wherein if the commit order number for the particular transaction and the next-to-commit field do not have a same value, putting the particular transaction into a hold state until the particular transaction is awakened at a later point in time after a predecessor transaction commits.

13. A computer-readable medium having stored thereon computer-executable instructions for causing a computer to perform the method recited in claim 1.

14. A method, implemented on a computer system, for providing contention management with ordering in a software transactional memory system, the method comprising:
    allowing a pre-determined commit order to be specified for a plurality of transactions within a first transaction group at any point in time before executing the plurality of transactions;
    executing a first transaction of the first transaction group and a second transaction of the first transaction group, the first transaction and the second transaction executing atomically with respect to other transactions in a software transactional memory;
    invoking a contention management process when a conflict occurs between the first transaction and the second transaction; and
    committing the first transaction and the second transaction in accordance with the pre-determined commit order specified for the plurality of transactions within the first transaction group, wherein the method is performed by at least one computing device of the computer system.

15. The method of claim 14, further comprising:
using the pre-determined commit order to provide a respective commit order number for the plurality of transactions within the first transaction group;
determining, by the contention management process, whether the first transaction and the second transaction are included in a same transaction group;
comparing, when the determining determines that the first transaction and the second transaction are included in a same transaction group, the commit order number provided for the first transaction and the commit order number provided for the second transaction, and allowing a particular transaction of the first transaction and the second transaction to proceed based on which of the first transaction and the second transaction has a lower respective commit order number.

16. A computer-readable medium having stored thereon computer-executable instructions for causing a computer to perform the method recited in claim 14.

17. A computer-readable medium having stored thereon computer-executable instructions for controlling a computer having a software transactional memory system to perform a method comprising:
allowing a pre-determined commit order to be specified at any time before runtime for a first transaction and a second transaction to be executed atomically with respect to other transactions within a software transactional memory;
invoking a contention management process when a conflict occurs between the first transaction and the second transaction;
determining a transaction to commit from the first transaction and the second transaction based on the specified pre-determined commit order; and
committing the determined transaction, wherein
the method is performed by the computer.

18. The computer-readable medium of claim 17, wherein the method further comprises:
enforcing commit ordering within nested transactions.

* * * * *